Jan. 30, 1945.  G. A. MOORE  2,368,561
METHOD OF PACKING COFFEE
Filed Jan. 23, 1941
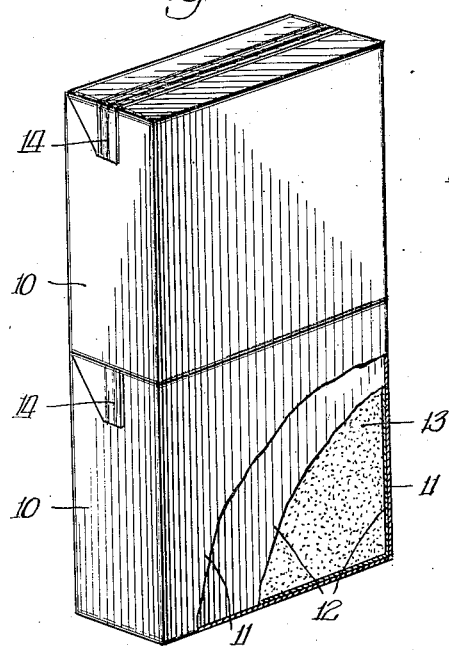
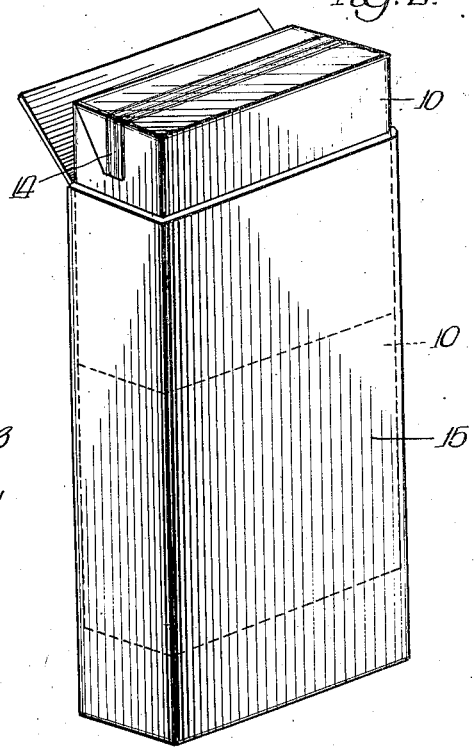
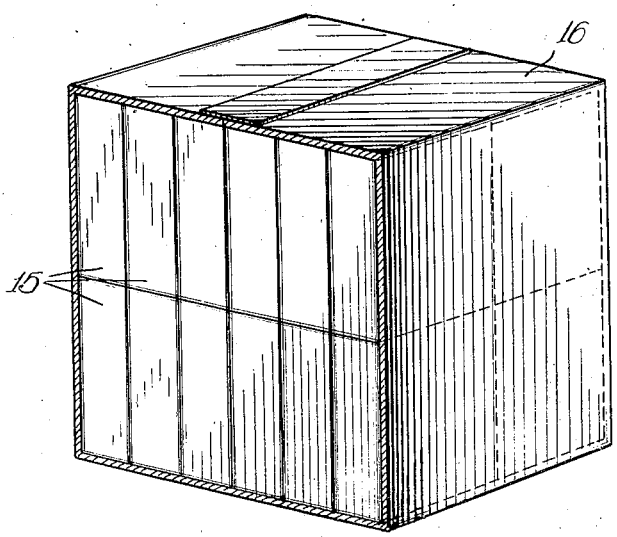
INVENTOR.
George Arlington Moore,
BY Cromwell, Greist + Warden
Attys.

Patented Jan. 30, 1945

2,368,561

UNITED STATES PATENT OFFICE 2,368,561

METHOD OF PACKING COFFEE

George Arlington Moore, New York, N. Y., assignor to Shellmar Products Company, Mount Vernon, Ohio, a corporation of Delaware Application January 23, 1941, Serial No. 375,590

7 Claims. (Cl. 99—152)

The present invention relates to an improved method for packing freshly roasted coffee, and refers in particular to a process wherein the freshly roasted coffee is packed in an hermetically sealed flexible container of such type as adequately to preserve the freshness of the coffee for extensive periods of time.

A principal object of the invention is the packing of freshly roasted coffee in a flexible container composed at least in part of transparent rubber hydrochloride, a material having a solution factor with respect to gaseous carbon dioxide, sealing the container about the coffee, and confining the sealed container in a pressure-resistant compartment which prevents the walls of the flexible container from being distended upon the development of an interior gaseous pressure.

An additional object of the invention is the provision of a method of packing freshly roasted coffee in which (1) the coffee, while in a fresh condition and prior to loss of the carbon dioxide which ground, freshly roasted coffee normally evolves, is loaded into a container composed of a sheet of thermoplastic rubber hydrochloride as an inner layer and a paper outer layer of gaspervious nature, (2) the container is sealed compactly about the coffee to provide a package of such volume that the walls of the container normally would be distended by the substantial interior pressure resulting from evolution of the carbon dioxide by the coffee, (3) the package is confined in an outer container which will prevent such distension of the walls of the package so as to hold the gas developed by the coffee under substantial pressure, whereby the solubility factor of the carbon dioxide with respect to the transparent rubber hydrochloride materially is increased, and (4) the coffee so packaged is retained under the restrictive condition for at least as long a period of time as ground, freshly roasted coffee normally develops or evolves carbon dioxide.

Still another object of the invention is to provide for the packing of ground, freshly roasted coffee by loading the coffee into a container composed of transparent rubber hydrochloride laminated to paper, hermetically sealing the container compactly about the coffee, loading one or more of such sealed containers into a paper board carton or wrapper which fits tightly about the sealed packages, and then loading a plurality of the cartons in a tightly fitting condition in a relatively rigid shipping case, the cartons and the shipping case, individually or combined, being of such nature as to prevent expansion of the flexible walls of the inner container in which the coffee is loaded, and retaining the cartons in the shipping container for a period of time at least as long as that in which hermetically packaged, freshly roasted, ground coffee normally develops a pressure through evolution of carbon dioxide.

Other objects will be apparent upon consideration of the following description of a preferred embodiment of the invention aided by reference to the accompanying drawing, in which Fig. 1 is a perspective view of two individual package units which have been loaded with coffee;

Fig. 2 is a perspective view showing the loading of these individual units in a tightly fitting paper board carton; and Fig. 3 is a sectional view through a relatively rigid shipping case showing the loading therein, in tightly fitting condition, of a plurality of the cartons shown in Fig. 1.

A great deal of difficulty has been encountered heretofore in the packaging of ground, freshly roasted coffee in flexible containers. Coffee has the property of developing and evolving carbon dioxide in substantial quantities upon being roasted and ground, the period of gas evolution usually continuing for many hours. Ground coffee deteriorates rapidly when exposed to the air. For these reasons the method largely used heretofore for keeping coffee fresh is to pack it under vacuum in hermetically sealed tins, the object being to prevent egress of gas and ingress of air. Vacuum packed containers of tin are expensive, so there has been an attempt to use flexible containers composed of rubber hydrochloride laminated to paper for packaging and hermetically sealing freshly ground coffee. However, the carbon dioxide pressure developed within hermetically sealed flexible containers ordinarily causes them to balloon or swell, so that such packages occupy considerably larger space than was intended when the coffee was packaged and they acquire an unsightly, bloated appearance that sharply decreases their merchantability. In one of such packaging efforts the coffee was loosely packed in a container that was made sufficiently large to provide an expansion space for accommodation of the carbon dioxide evolved from the coffee. That is, a bag was used which was much larger than was required to hold the volume of coffee packaged within it. The extra room in the bag was for the evolved carbon dioxide, the conception being that by providing this extra room the carbon dioxide would not develop such an internal pressure as to damage the container or make the walls of the container appear inflated. That method, although widely exploited, has not proved successful.

In accordance with the present invention the coffee is packed in a freshly roasted condition in a sealed, flexible container which consists of an inner layer of transparent rubber hydrochloride laminated to an outer layer of paper, and then subjected to subsequent steps which avoid the problems encountered heretofore.

The container itself may be of any suitable form and since the particular construction of the container does not constitute a part of the invention, except as specified, no special details for the construction of the container are necessary. In Fig. 1 the container 10 is shown as being composed of an outer sheet of paper 11 and an inner pellicle of transparent rubber hydrochloride, the two sheets preferably being laminated together by a suitable solution of rubber hydrochloride or other suitable adhesive. The package is provided with an interior which presents a continuous rubber hydrochloride face, thereby providing for hermetic sealing. As an initial step in the process the coffee in freshly roasted condition, preferably as soon after the roasting and grinding operation as possible, is loaded, as shown at 13, into the container 10. Thereafter the container is sealed compactly about the coffee. In fact, before sealing, it is preferred that the container with its load of coffee be vibrated so that the vertical walls of the container will assume a regular formation and the top may be sealed adjacent the body of the coffee to provide a package of substantially the same volume as the volume of the coffee. The package is shown as having a closure flap 14 which is formed by pressing the open mouth of the container together and applying heat and pressure to seal the mouth of the container adjacent the coffee.

It will be seen that the resulting package is of regular formation, that it presents an interior of continuous transparent rubber hydrochloride to provide a hermetically sealed package, and that the size of the container is substantially the same as the volume of the coffee packaged. Were a container of such character, packed with ground, freshly roasted coffee in the manner described, left for ordinary further handling, the walls of the container soon would be forced outwardly by the pressure resulting from normal evolution of carbon dioxide within the container, to such an extent as to break the seams of the container, or at least to ruin the appearance of the package by its resemblance to some bloated object.

Such destruction of the loaded container is prevented by the next step in the operation of the method of my invention, which consists in loading one or more sealed containers, prepared in the manner just described, immediately into a closely fitting paper board carton or the like indicated at 15. For example, two one-half pound packages assembled as shown in Fig. 1 are inserted into the closely fitting carton 15. The carton 15 may be of any suitable construction. There are many types of paper board cartons available for use in this procedure, so I have not designated any particular construction. The carton 15 in fitting closely against the sides of the packages 10 presents a pressure-resisting outer surface which, if the carton is strong enough, will prevent the outward bulging of the walls of the inner containers. However, most paper board cartons are not sufficiently strong to adequately resist the bulging tendency of the inner container. Therefore, the process also contemplates the loading of a relatively large number of the cartons 15 into a shipping case which is indicated at 16. The cartons 15 are fitted tightly in the shipping case 16. While it has been specified that the case 16 is a shipping case, it is not necessary that it be of this particular construction. It is permissible, within the scope of my invention, to confine the packages in any suitable pressure-resisting container that will hold them in closely abutting relation and keep their exterior walls from expanding while carbon dioxide is being evolved within the packages.

Confining the coffee in the manner described prevents the interior package from bulging, so that the carbon dioxide which is evolved is held in the inner container under substantial pressure. Apparently, under the conditions of the process, the transparent rubber hydrochloride has a solubility factor with respect to the carbon dioxide which allows the evolved carbon dioxide to dissolve in the transparent hydrochloride from the interior of the container and to escape from the outer surface of the container into the atmosphere. This action provides for a valve-like escape of carbon dioxide from the package and at the same time prevents ingress of air into the package, thus keeping the coffee in practically perfect condition until the package is opened for use, and maintaining the package in substantially the same shape as it was when initially packed, before the evolution of carbon dioxide. As a matter of fact, the pressure exerted on the package imparts a degree of rigidity that enables it to hold its shape even better than when it was packed. Thus, by the improved method of this invention it is possible to pack ground, freshly roasted coffee compactly in an attractive, hermetically sealed flexible container, in which no space is provided for the accommodation of carbon dioxide evolved by the coffee, in which the freshness of the coffee may be preserved, and in which the coffee may be merchandised without losing any of the original attractiveness of the package.

The shipping case 16 may be of any suitable formation. Strong corrugated shipping containers have been used successfully for the purpose. Wooden containers are even better since they provide more rigid and pressure-resistant walls.

The type of the container 10, as well as of the outer confining containers 15 and 16, may be different from those shown in the drawing. A paper and transparent rubber hydrochloride sheeting for formation of the container 10 has been shown, although the process is not confined to the use of these particular materials. Metal outer containers may be utilized for confining the packaged coffee during the period of evolution of carbon dioxide.

All of these various changes are intended to be included in the appended claims.

I claim:

1. The method of packing coffee, which comprises loading the coffee in freshly roasted and ground condition into a flexible container completely to fill the same, said container having an inner layer of rubber hydrochloride and an outer reinforcing layer, said inner layer having a solution factor with respect to carbon dioxide, hermetically sealing the container to prevent ingress of air, and confining the sealed container within a pressure-resistant compartment to prevent substantial expansion of the walls of said container, said compartment being so shaped to retain the original form of the container when the latter is under pressure due to generation of carbon dioxide by the coffee within said container, and retaining the sealed container in said compartment for a period of time at least as long as the coffee normally evolves carbon dioxide.

2. The method of packing coffee, which comprises loading ground coffee in freshly roasted condition into a container composed of thermoplastic rubber hydrochloride having an outer reinforcing layer of paper laminated to said rubber hydrochloride layer, hermetically sealing the container compactly about the coffee to prevent ingress of air through the sealed portion, and confining the sealed container in an expansion-resisting compartment, said compartment being adapted to maintain the original shape of the container as packed and to prevent the walls of said container from expanding due to generation of carbon dioxide gas within said container from its contents, and retaining the sealed container in said compartment for a period of time at least as long as the coffee normally evolves carbon dioxide.

3. The method of packing coffee, which comprises loading the coffee in freshly roasted condition after grinding into a container composed of an inner layer of thermoplastic rubber hydrochloride and having an outer protective gas-pervious layer of material laminated thereto, hermetically sealing the container compactly about the coffee, confining the container in a gas-pervious pressure resisting container adapted to maintain the original shape of said package and to prevent expansion of the walls of said container due to generation of carbon dioxide by the coffee within said container, and retaining the sealed container in said gas-pervious pressure-resistant container for a period of time at least as long as the coffee normally evolves carbon dioxide.

4. The method of packing coffee, which comprises loading the coffee in freshly roasted and ground condition into a container composed of thermoplastic rubber hydrochloride on its inner surface laminated to a reinforcing web of paper material, said laminated construction being adapted to prevent the ingress of air through the walls of the container, hermetically sealing the container about the coffee in compact relation, and loading the container into an outer container of gas-pervious nature and constructed to resist outward pressure by said container due to the generation of gas by said coffee within said container, said outer container being so shaped that it will maintain the original form and shape of the coffee container when placed therein until said outward pressure due to the contents of the coffee has been stabilized, and retaining the sealed container in said outer container for a period of time at least as long as the coffee normally evolves carbon dioxide.

5. The method of packing coffee, which comprises loading the coffee in freshly roasted and ground condition into a container composed of an inner layer of thermoplastic rubber hydrochloride and an outer paper layer laminated thereto by means of a suitable laminating adhesive, said laminated material being substantially impervious to air, hermetically sealing said container by the application of heat and pressure compactly about said coffee, loading said container in a closely fitting paper board container, loading a plurality of said paper board containers in tightly fitting relation in a form-retaining shipping case in a manner adapted to establish the maintenance of the original form and shape of each container, and retaining said paper board containers in said case beyond the period within which the walls of said first named container otherwise would swell by evolution of carbon dioxide gas from said coffee.

6. The method of packing coffee, which comprises loading the coffee in freshly roasted and ground condition into a container composed of an inner layer of thermoplastic rubber hydrochloride and an outer paper layer laminated thereto by means of a suitable adhesive laminating medium, said combination of rubber hydrochloride, paper and laminating medium being adapted to prevent the ingress of air through the walls of the container when formed, hermetically sealing said container compactly about said coffee, loading said container in a closely fitting paper board container, loading a plurality of said paper board containers in tightly fitting relation in a form-retaining case adapted to maintain the shape of each individual container as originally filled with coffee, and retaining said paper board containers in said case beyond the period within which substantial pressure due to the evolution of carbon dioxide would be evolved by said coffee.

7. The method of packing coffee, which comprises loading the coffee in freshly ground and roasted condition into a container composed of thermoplastic rubber hydrochloride laminated to a protective web with a laminating material the combination of which is substantially impervious to air, hermetically sealing the container about the coffee to provide a package of the same volume as the volume of the coffee by tightly compacting the walls of the container, loading the package in a closely fitting paper board container, and loading a plurality of said paper board containers tightly in a form-retaining case and retaining the plurality of paper board containers in the form retaining case for a period of time at least as long as the coffee normally evolves carbon dioxide.

GEORGE ARLINGTON MOORE.